Dec. 31, 1968 M. E. FITTS 3,419,134
FOAMABLE PACKAGE AND METHOD FOR FORMING CELLULAR FOAM
Original Filed June 14, 1965

INVENTOR
MARTIN E. FITTS
BY
ATTORNEY

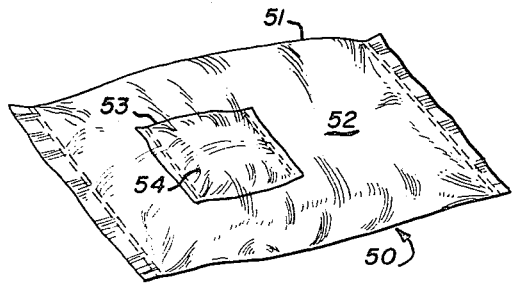
Fig-5
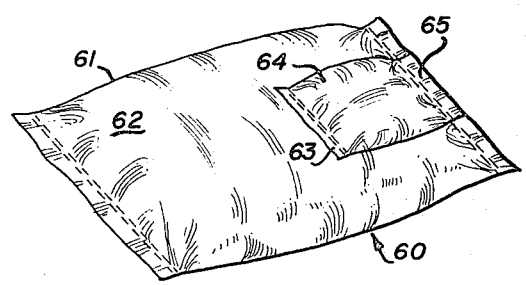
Fig-6
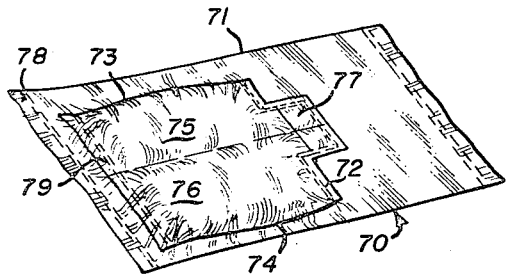
Fig-7
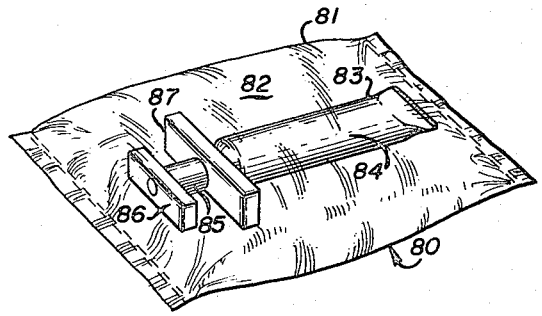
Fig-8
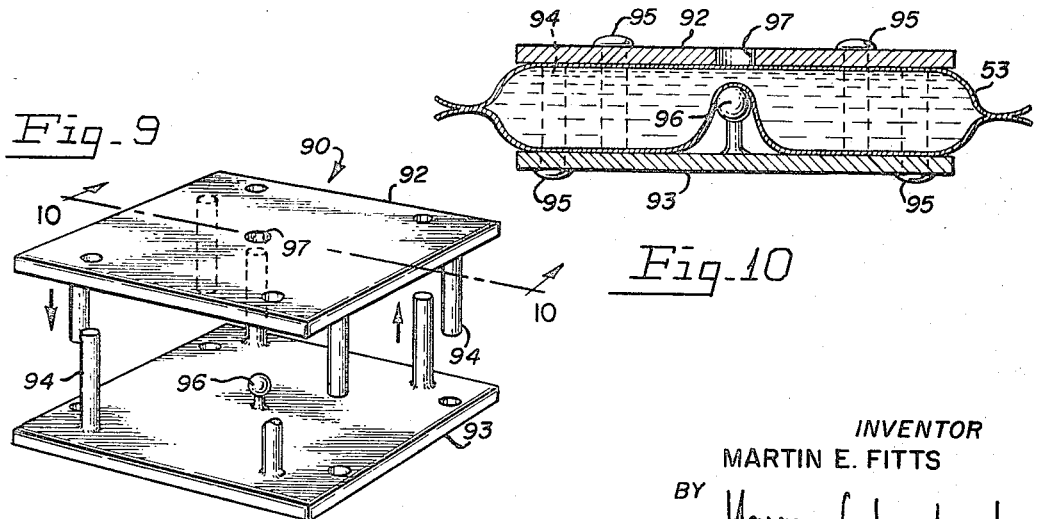
Fig-9
Fig-10

United States Patent Office 3,419,134
Patented Dec. 31, 1968

3,419,134
FOAMABLE PACKAGE AND METHOD FOR FORMING CELLULAR FOAM
Martin E. Fitts, 3073 Markingdon Ave., San Jose, Calif. 95127
Continuation of application Ser. No. 463,845, June 14, 1965. This application July 8, 1966, Ser. No. 563,921
9 Claims. (Cl. 206—47)

ABSTRACT OF THE DISCLOSURE

Two or more components of a chemical plastic foaming system, such as resinous component and an activator component, are sealed into an inner pouch in which they are separated by some rupturable partition. The inner pouch is enclosed within an outer pouch having a volumetric capacity substantially equal to the expanded foam generated by the components within the inner pouch after intermixing.

---

This is a continuation of Ser. No. 463,845, filed June 14, 1965 and now abandoned.

This invention relates to a foamable package and more particularly to a method and an article for preparing cellular plastic foam in a shape desired for an intended end use. This invention also relates to the instant preparation of foam articles and the packaging of the foam system ingredients which, upon being intermixed, generate the cellular foam.

The foamable package of this invention has many uses and, generally speaking, may be employed wherever there is a need or a requirement for a cellular foam. One important field of application is the packaging field in connection with certain objects and materials that require special packing for the purpose of shipping, storing, or for merely preserving the same, either for the protection of such objects or materials, or for the protection of the vehicle in which such objects or materials are shipped. The objects to be protected for their own protection include fragile articles such as electronic instruments, photographic gear, delicate optical instruments and the like, which are easily broken and which may be vibration and shock sensitive.

The objects and materials from which the shipping vehicle must be protected include very heavy, bulky and irregularly shaped objects such as airplane parts, gears, torpedoes, gun barrels, trucks and the like. To avoid these parts from tearing loose, they have to be tightly secured within regularly shaped containers, such as shipping boxes, which are easily fastened or secured inside the shipping compartment. For both, the fragile and the bulky objects, it is important that the same be secured from any movement within the container when the container is tipped or turned, or exposed to a severe environment such as shock or vibration. This is particularly important in connection with the shipping of heavy objects by plane or boat, where, if the object should get loose within the container, it may damage or even destroy the transporting vehicle.

The conventional procedures for packaging or packing such articles and materials comprise the construction of special boxes or crates, the use of soft yielding packing materials such as excelsior, shredded paper or cellular plastic of special configuration which are not only expensive and time consuming, but also involves steps or acts such as fitting, nailing and the like.

One attempt to overcome these difficulties, of which I am aware, is the use of a foam plastic that is capable of being cast or foamed in situ, and that is poured about or on the object to be packed or packaged in liquid or semi-liquid state and then allowed or caused to foam up to encase the object at atmospheric pressure and room temperature. Such packaging concept is described in U.S. Patent Re. 24,767 which was issued on Jan. 19, 1960, to Simon et. al. for Package with Cellular Plastic Packaging Means.

While the utilization of liquid foam for packaging overcomes many of the disadvantages of the prior art, it requires the preparation of the foam plastic in liquid form with the attendant use of an open container and the attendant problem of storage, measuring, and handling. Further, the object to be packed or packaged either will be exposed to the foam directly with the attendant problem of stickage, or in some cases an unwanted reaction, or else the object around which the foam is poured has to be packaged to protect it from direct contact with the foam. In case of very large objects, weighing many thousands of pounds, this prepackaging is cumbersome and expensive.

It is, therefore, a primary object of this invention to provide a foamable packaging method, utilizing the components to be combined in measured quantities, to generate a flexible or rigid foamed plastic which is simple and foolproof to use, clean, versatile, inexpensive and extremely convenient.

It is a further object of this invention to provide a foamable package by which the cellular foam may be prepared inside a hermetically sealed plastic pouch.

It is another object of this invention to provide a foamable package which is simply kneaded to form the foam inside a flexible pouch and, which prior to foaming or hardening, is placed around the object to be packaged or into the spaces between the object and the container, and which, upon hardening, becomes resilient to the desired or required degree and takes on the shape of the object or the space between the object and the container to cradle or support the object in such manner that it is well protected against heavy or severe impact as well as against vibration or the like.

It is still a further object of this invention to provide a foamable package within a sealed pouch in its unfoamed ingredient state which may then be foamed in situ, or just before being placed in situ, by the simple expedient of rupturing a diaphragm between the ingredients for making the foamable plastic contained within the sealed pouch without breaking the pouch.

The foamable package of this invention may also be utilized as an insulating body in the construction industry as wall or pipe insulation in which the package, after foaming but before hardening, is placed to harden in the shape of the occupied space. This obviates fastening the insulation to the supporting structure and is particularly important in sound insulation where nails or the like, used as fastening devices, are highly objectionable.

It is therefore a further object of this invention to provide a foamable package for insulating walls, pipes and the like which is foamable within a sealed pouch and which is placed in situ before hardening.

The invention is also useful for making articles out of foam such as toys, life rafts and the like. So employed, the outer pouch of the package is shaped to reflect the final or desired form of the article and the foam within the package is utilized to inflate the pouch to form the desired article after becoming rigid. Another application of the invention is to make available a package having the ingredients of a foaming system enclosed within a mixing pouch, with the ingredients being separated by a rupturable membrane which is broken to generate foam for purposes other than filling a pouch.

It is therefore another object of this invention to provide a foamable package within an outer pouch which, upon being foamed, will generate foam to fill an outer pouch of desired shape.

It is another object of this invention to prepackage the components for a foaming system in measured quantities and within a single outer envelope.

It is still a further object of this invention to provide a foamable package which, upon being foamed, will generate a foam many times the volume of the ingredients, and which will rigidify within an outer pouch which may have its own particular form or which may be externally constrained to conform to some desired form.

Briefly, in accordance with one embodiment of the present invention, two or more components of a chemical plastic foaming system, such as a resinous component and an activator component, are sealed into an inner pouch in which they are separated by some rupturable means. The inner pouch is enclosed within an outer pouch which is of such a size that it will just contain the expanding foam generated by the components in the inner pouch upon intermixing. When the components are combined by rupturing the means separating them and blending, the foam expands to rupture the inner pouch and expands into the outer pouch filling the same and becoming solidified.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

FIGURES 5, 6, 7 and 8 are enlarged plan views of different embodiments of the inner pouch configuration of the foamable package of this invention;

FIGURE 9 is a perspective view of a rupturing device, for the activator envelope inside the inner pouch, in exploded form;

FIGURE 10 is a plan view of the device in FIGURE 9, taken on line 10—10 thereof, showing the activator envelope in place;

Figure 1:
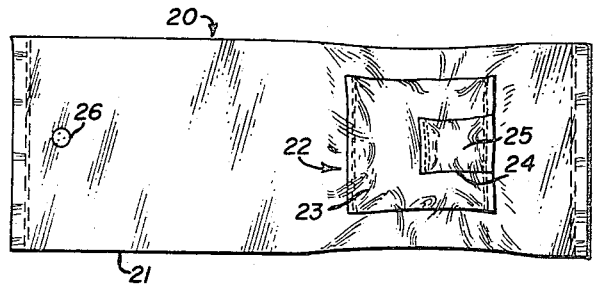
FIGURE 1 is a plan view of a foamable package in accordance with this invention.

Referring now to the drawing, and particularly to FIGURE 1 thereof, there is illustrated a foamable package 20, constructed in accordance with the invention, which comprises an outer pouch or envelope 21 enclosing an inner pouch or envelope 22. Inner pouch 22 contains a resinous component 23 and an envelope 24 which is filled with an activator component 25.

Resinous component 23 and activator component 25 are substances selected to react with one another upon being intermixed to generate a cellular plastic foam having a desired volume, degree of flexibility (or rigidity) and density depending on the use to which foamable package 10 is to be put. In other words, resinous component 23 and activator component 25 are the components of a foam system for providing a foam having selected characteristics.

The term foam system, as used herein, is intended to include any of the many well known plastic foams such as foamed urethanes, foamed epoxies, foamed silicones, foamed phenolics, synthetic foams and others. The particular resinous components and activator components utilized in practicing the instant invention do not form any part of the invention and are well documented in the literature. See, for example, "Polyurethanes" by Bernard Dombrow, Reinhold Publishing Co., 1960, which gives many formulations for plastic foam.

The term resinous component, as used herein, may comprise a mixture of several resins. For example, for generating polyurethane foam, the resins utilized are of the type terminating with the hydroxyl groups which are also known as polyols. Likewise, the term activator component does not necessarily comprise a single substance but may be a mixture of several substances. Typically, for generating polyurethane foam the activator component includes tertiaryamines (N-methylmorpholine, N-cocomorpholine, and dimethylcetylamine) and metallic catalysts such as organo-tin (dibutyl tin dulaurate) or a combination of these and others. Even though the reaction between the polyol and the di-isocyanate in the presence of a catalyst is not entirely understood, it is believed that it produces a —NCO terminated prepolymer. This prepolymer further reacts with water, with the aid of the catalyst and the polymerizer, to form the urethane. The water reacts with the —NCO groups at a rate controlled by the amine catalyst to produce carbon dioxide gas. As the polymerization proceeds, the viscosity increases and the resin grows in volume due to the formation and entrapment of carbon dioxide. The particular reaction here involved is exothermic, and the heat liberated by the reaction aids in curing the foam. This particular type of foam system is referred to as the Carbon Dioxide Blowen foam system. The other type of foaming system, to which this invention relates, is the Freon Blowen foaming system (Freon is a trade name of DuPont Corporation for trichloromonofluoromethane) where the water is held low and Freon is mixed in as a liquid which is changed to its gaseous state by the heat generated during the reaction and acts as the blowing agent.

Inner pouch 22 houses a self-contained foaming system which is activated by rupturing envelope 24 and intermixing components 23 and 25 in pouch 22. As foam is generated, the volume of the foam system expands, and ruptures inner pouch 22. In connection with this invention, inner pouch 22 serves several purposes. It affords an opportunity to prepackage preselected amounts and types of foam components to yield a plastic foam of a desired composition, density, rigidity (or flexibility), and volume. Further, because of the presence of envelope 24, it provides a two compartment container in which the compartments are separated by a rupturable wall to keep the component ingredients separated in an unactivated state prior to use. Inner pouch 22 also serves as a mixing chamber, after rupturing envelope 24, for combining the resinous component with the activator component for proper reaction. Accordingly, inner pouch 22 and envelope 24 may be constructed of almost any material that is rupturable, somewhat pliable and chemically inert to the components. Rubber, plastic film or metal foil have been found to meet these requirements and produce an envelope which will keep the chemicals in an inert state until they are activated, which is rupturable to allow the components to be combined and which is pliable enough to afford an opportunity for blending the chemicals together. The preferred material, which has been found to meet all these requirements, is flexible plastic film which has the further advantage of being heat sealable.

The material out of which outer envelope 21 is constructed depends on the use to which foamable package 20 is to be put. As has already been explained, foamable package 20 finds application in the packaging field for which application it is desired that the generated foam conform, upon hardening, to the shape of the object to be packed or to the space between the object and the container. For such application, outer pouch 21 should be pliable or flexible and therefore may be constructed of the same material as inner pouch 22, that is, of a somewhat pliable and flexible substance such as rubber, plastic or metal foil. For such application, the function of outer pouch 21 is to conform to some external shape and to house the final foamed mass without breaking so that flexibility is of primary importance. A heat sealable flexible plastic film is admirably suited for this purpose. This also applies to insulating applications.

For applications where the foamable package is utilized to create and shape foam articles, outer pouch 21 is shaped in the form of the article to be created, such as for example, life rafts, toys and the like. For such applications outer pouch 21 is preferably constructed of a more rigid material, such as for example, a heavier plastic film, rubber or the like.

The volume of outer pouch 21 is selected to snugly accommodate the generated foam. It is well known that the expansion ratio of the foamed mass to the volume of the unfoamed components varies widely with the composition and relative quantities of the components. Typically, the expansion ratio may be 30:1, but may vary between wide limits. Expansion ratios lower than 5:1 and higher than 60:1 are not unknown. If the foamable package of this invention is utilized for packaging, outer pouch 21 may not need to be tight since the shape in the foam is determined by an outer form. However, when the foamable package is utilized to form articles, the shape of outer pouch 21 determines the shape of the article and consequently must be small enough to be completely filled by the foamed mass.

Figure 2:
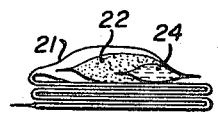
FIGURE 2 is a side view of the foamable package of FIGURE 1 in folded form.

Referring now to FIGURE 2, there is shown a side view of the foamable package of FIGURE 1 with outer pouch 21 folded. This illustrates a further advantage of the present invention, namely that the foamable package of this invention has a small volume prior to foaming and is more conveniently stored or shipped than the plastic foam itself.

Outer pouch 21 is generally sealed after all the air has been removed from its interior so that its volume can be taken up by the foam. To assure that the interior of pouch 21 be filled completely by the foam, the pouch may be provided with a venting means, such as shown at 26, which affords an exit for any gaseous matter either initially trapped inside outer pouch 21 or any excess gas generated during the reaction of the foaming components. As a practical matter, a number of small pin holes within outer pouch 21, with a tape placed thereon, provide an excellent gas vent for allowing the escape of trapped air or other gaseous substances when the pressure within outer pouch 21 builds up sufficiently to overcome the adhesive force of the tape along a small vent channel.

Figure 3:
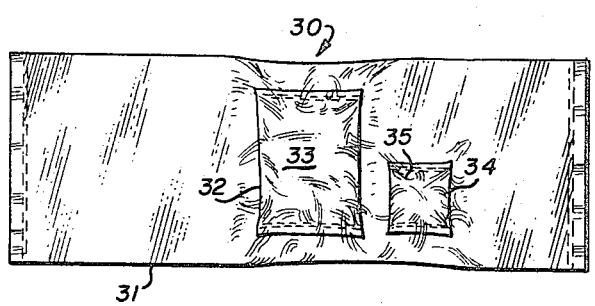
FIGURE 3 is a plan view of another embodiment of the foamable package of FIGURE 1.

Referring now to FIGURE 3, there is shown an alternate embodiment of a foamable package of this invention which is generally designated by reference character 30. Package 30 comprises an outer pouch 31 which houses a first inner pouch 32 filled with a resinous component 33 and a second inner pouch 34 which houses an activator component 35.

To combine resin component 33 with activator component 35, pouches 32 and 34 are ruptured by pressure applied through outer bag 31 and are intermixed by kneading the same. It is to be noted that in the embodiment shown in FIGURE 3 the mixing chamber is the outer pouch 31.

Figure 4:
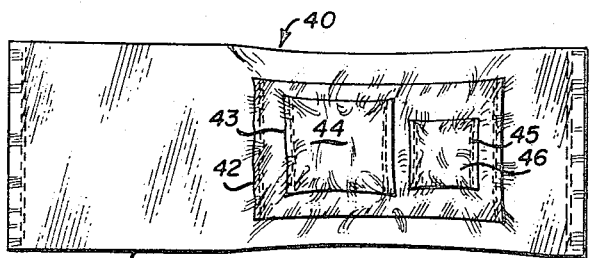
FIGURE 4 is a plan view of a further embodiment of the foamable package of FIGURE 1.

Referring now to FIGURE 4, there is shown another embodiment of the foamable package of this invention and generally designated by reference character 40. Foamable package 40 comprises an outer pouch 41 and an inner pouch 42 which houses a first envelope 43 containing a resin component 44 and a second envelope 45 containing an activator component 46. Foamable package 40 differs from the foamable packages shown in FIGURE 1 and FIGURE 3 in that there is provided an inner pouch 42 having a volume larger (about 1.5 to 3.0 times) than the volume taken up by resinous component 44 and activator component 46 to afford a more effective enclosure for blending the components of the foaming system with one another. After intermixing foaming components 44 and 46 the foam mass, upon expanding, will rupture inner pouch 42 and expand into outer pouch 41 as hereinabove described.

Referring now to FIGURES 5, 6, 7 and 8, there are shown respectively four embodiments of inner pouches which separately house the components of a foaming system. These inner pouches may be sealed within outer pouches in the manner explained hereinabove, or may be utilized by themselves as a foaming system to generate foam of a desired volume, density, flexibility (or rigidity), and composition for general usage.

Foaming package 50, shown in FIGURE 5, comprises an outer envelope 51 which also performs the function of a mixing chamber and which contains a measured amount of one of the foaming components 52 and an envelope 53 which contains a measured amount of the other foaming component 54. The foaming system is activated by rupturing envelope 53 and intermixing components 52 and 54. The expanding foam will then rupture envelope 51.

Foaming package 60, shown in FIGURE 6, is similar to package 22 of FIGURE 1 and includes an outer envelope 61 which likewise performs the function of a mixing chamber and which is filled with a measured amount of one of the components 62 of the foaming system. It also contains an inner envelope 63 which is filled with a measured amount of the other foaming component 64. For ease of rupturing, the edge 65 of envelope 63 is rigidly sealed to the edge of envelope 61. In this manner, envelope 63 can be broken by gripping edge 65 in one hand and with other hand envelope 63 is gripped through envelope 61 and twisted until the edge tears.

Foamable package 70, shown in FIGURE 7, comprises an outer envelope 71 which serves as a mixing chamber and which is subsequently ruptured by the expanding foam mass. Envelope 71 houses an envelope 72 which is divided into two compartments 73 and 74 which respectively are filled with measured amounts of a resinous component 75 and an activator component 76. There is also provided a tear or snap-off tab 77 which facilitates the opening of envelope 72 to remove components 75 and 76 from compartments 73 and 74 for intermixing. Edges 78 and 79 may be combined into a single edge by heat sealing in the manner shown in FIGURE 6. The volumetric capacity of envelope 71 may be two to four times the volume of the ingredient components for good blending.

Foaming package 80, shown in FIGURE 8, comprises an outer envelope 81 which also serves as a mixing bag and which houses a measured amount of one of the components 82 of the foaming system. Envelope 81 also includes a tubular enclosure 83 which may be constructed similar to that of a toothpaste tube to varry the amount of activator component 84 utilized for intermixing. For ease of access, tubular enclosure 83 is provided with a closure cap 85 having an enlarged turning handle 86 integral with cap 85. There is also provided a holding bar 87 integral with enclosure 83 to facilitate its opening. Opening the enclosure may be accomplished by turning in case of a screw cap or by breaking in case of a fixed seal.

Referring now to FIGURES 9 and 10, there is shown an embodiment of a rupturing means 90 for rupturing an envelope, such as envelope 53, containing activator component 54 shown in FIGURE 5. Rupturing means 90 comprises a pair of plates 92 and 93 which are supported for parallel clamping motion by guide rods such as 94, attached to one plate and engaging bushings in the other. Plates 92 and 93 are secured against separation by enlarging the end portions of guides 94 projecting through the bushings as shown at 95. Accordingly, the structure comprises two parallel plates which are movable between a first position to provide maximum separation and a second position where they are almost in touching contact. There is also provided a rupturing plunger 96 on plate 93 and a clearance opening 97 in plate 92 in alignment with plunger 96. When the plates are moved to their second position, plunger 95 passes through clearance opening 96.

As shown in FIGURE 10, activator envelope 53 is accommodated snugly between plates 92 and 93, without being ruptured, with the plates in their first position. When the plates are moved to their second position, plunger 96 will move into opening 97 and rupture envelope 53. Rupturing means 90 may be used in connection with foamable package 50 where it would accommodate envelope 53 and, in turn, be enclosed within envelope 51. It is to be understood that rupturing device 90 may be utilized in connection with any of the inner envelopes containing one of the foaming components, but if the envelope surrounding the foaming component is tightly packed within a thin plastic film, rupturing may often be conveniently done by hand without the use of mechanical rupturing means.

Figure 13:
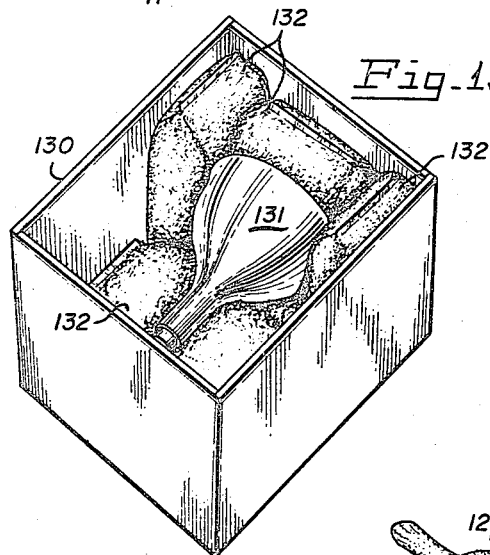
FIGURE 13 is an exemplary drawing, in perspective, of an article packaged in accordance with the method of this invention.
Figure 11:
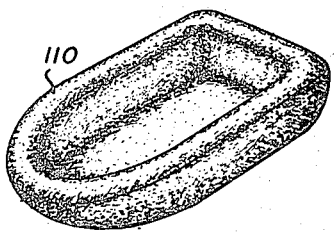
FIGURE 11 is an exemplary drawing, in perspective, of a buoyant article created by the method of this invention.
Figure 12:
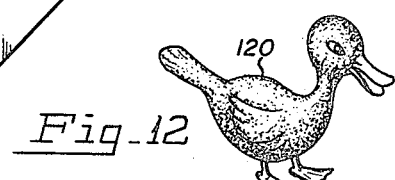
FIGURE 12 is an exemplary drawing, in perspective, of a toy article created by the method of this invention.

Referring now to FIGURE 11, there is shown an outer envelope or pouch 110 having the form of a life saving emergency float. Envelope 110 may accommodate any of the foam packages shown in FIGURES 5, 6, 7 or 8 for generating a foam to fill the same. FIGURE 12 shows an outer envelope 120 in the shape of a duck which may likewise enclose any of the foamable packages shown in the drawings to fill the same. FIGURE 13 shows a packing box 130, containing an irregular object 131, and a number of foam packages 132 such as are shown in FIGURES 1, 3 or 4 for packaging object 131 tightly within the packing box.

There has been described a foamable package and a method of generating foam from measured prepacked quantities of foaming components which is admirably suited for packaging application and for generating foam articles. Further, there has been disclosed a method of packing foam components for reaction with one another within a mixing bag to generate a measured amount of foam of predetermined composition, density and rigidity.

What is claimed is:

1. A foamable package including measured quantities of a resinous component and an activator component which upon being intermixed, generate a foam mass extending to a volume many times larger than the volume of the components, said foamable package comprising:
   a flexible sealed outer pouch having a volumetric capacity substantially equal to the generated foam mass, and at least one inner sealed flexible pouch forming a pair of compartments within said outer pouch having rupturable walls, one of said compartments containing said measured quantity of the resinous component and the other compartment containing said measured quantity of the activator component, the wall of at least one of the compartments being sufficiently weak to be rupturable by force exerted thereon through the outer pouch to permit intermixing of said components without rupturing the outer pouch.

2. A package as defined in claim 1 wherein the outer pouch is preshaped to form a life saving emergency float when filled with the foam.

3. A package as defined in claim 1 wherein the outer pouch is preshaped to form a duck when filled with the foam.

4. A package as defined in claim 1 further including means for venting air and gas from the outer pouch during generation of the foam.

5. A package as defined in claim 1 wherein one of the compartments is contained in the other and the wall of said other compartment is rupturable by the force of the expanding foam mass generated when the resinous component and the activator component are combined.

6. A package as defined in claim 5 further including means sealing an edge of one compartment to an edge of the other compartment.

7. A package as defined in claim 1 wherein the walls of both compartments are sufficiently weak to be rupturable by force exerted thereon through the outer pouch.

8. A package as defined in claim 7 further including an inner pouch having a cubic capacity slightly greater than the cubic capacity of the compartments, said compartments being mounted in said inner pouch, the wall of said inner pouch being rupturable by the force of the expanding foam mass generated when the resinous component and the activator component are combined.

9. A package as defined in claim 8 further including a tear tab connected to an edge of each of the compartments to facilitate the rupturing of the walls.

References Cited

UNITED STATES PATENTS

| | | | |
|---|---|---|---|
| 2,655,485 | 10/1953 | Hoffman | 9—11 X |
| 2,952,462 | 9/1960 | Planin | 46—156 X |
| 2,760,302 | 8/1956 | Cheskin | 46—156 X |
| 3,059,253 | 10/1962 | Sager | 206—47 |
| 3,150,387 | 9/1964 | Look et al. | 206—47 |
| 3,247,529 | 4/1966 | Benton | 5—82 |
| 3,271,332 | 9/1966 | Bond | 206—46 |

FOREIGN PATENTS

| | | |
|---|---|---|
| 557,968 | 5/1923 | France. |
| 666,329 | 7/1963 | Canada. |

JOSEPH R. LECLAIR, *Primary Examiner.*

J. M. CASKIE, *Assistant Examiner.*

U.S. Cl. X.R.

206—46